June 4, 1963  J. C. CLARK  3,092,351
SPIN CAST FISHING REEL
Filed July 21, 1960  2 Sheets-Sheet 1

INVENTOR.
JOSEPH C. CLARK
BY

June 4, 1963  J. C. CLARK  3,092,351
SPIN CAST FISHING REEL

Filed July 21, 1960  2 Sheets-Sheet 2

INVENTOR.
JOSEPH C. CLARK
BY
Lloyd J. Andres

United States Patent Office 3,092,351
Patented June 4, 1963

3,092,351
SPIN CAST FISHING REEL
Joseph C. Clark, Orlando, Fla., assignor to True Temper Corporation, Cleveland, Ohio, a corporation of Ohio
Filed July 21, 1960, Ser. No. 44,504
3 Claims. (Cl. 242—84.2)

This invention relates in general to fishing reels and more particularly to automatic controls for a spin cast type reel.

Reels prior to this invention required relatively complex mechanisms including level winding mechanisms and cam operated lever systems for shifting the winding dog to and from engagement with the line for winding and casting operations. Other reels of this type required a separate control in addition to a brake lever for controlling the spin cast type reel.

The present invention overcomes the above objections and disadvantages by the provision of an automatic centrifugal means for engaging the winding drum with the line at the beginning of the cranking or reeling operation and for level winding the line on a fixed spool.

Another object of the invention is the provision of a winding drum responsive to the movement of a thumb lever for braking and or holding the line and for rendering a centrifugal winding means inoperative when casting.

A further object of the invention is the provision of a drag means associated with a winding drum including a finger adjustment means for pre-tensioning a drag means for the line. Another object of the invention is the provision of an automatic holding means for holding the winding means in operative position following rotation of the winding crank.

Another object of the invention is the provision of a drum having a centrifugally operated dog for winding and unwinding a line from a spool in combination with a drag means and a wear plate permitting independent rotation of said drum with respect to said plate for distributing the line wear about the periphery of the disc.

These and other objects and advantages in one embodiment of the invention are described and shown in the appended specification and drawings in which.

Figure 1:
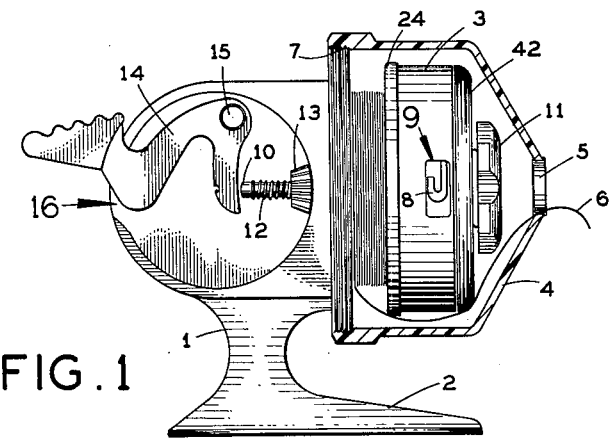
FIG. 1 is a side elevation of the reel with a portion of the housing thereof broken away showing the winding drum in normal winding position.
Figure 2:
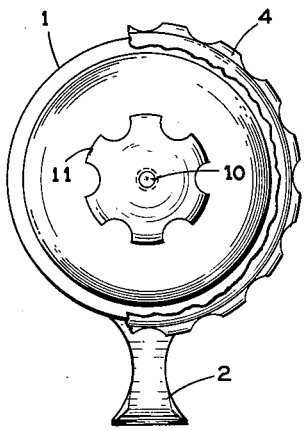
FIG. 2 is a front elevation of the reel shown in FIG. 1 with certain portions of the housing being removed.

Referring to FIG. 1, the reel consists of a main housing 1, preferably a one piece molding made from high corrosion and impact resistant plastic, with a foot member 2 integral therewith adapted to be secured to a conventional casting rod.

A hollow cylindrical drum 3 having an open end is journalled in housing 1 for rotation and reciprocation within drum housing 4, the latter being threaded at 7 on housing 1 for removal therefrom and being provided with a circular line guide 5 at its apex.

A winding dog 8 is adapted to project and retract through an aperture 9 in the periphery of the drum 3. A main shaft 10 retaining the drum 3 is journalled for rotation in housing 1 and has a finger adjustable drag nut 11 threaded on the outer end thereof. A compression spring 12 anchored at the outer end portion of the shaft and bearing against pinion 13 normally urges the drum into the normal position shown in FIG. 1.

A thumb lever 14 is pivoted on an integral boss 15 in housing 1 and projects through an aperture 16 for thumb operation. Lever 14 is constructed to engage and move shaft 10 and drum 3 outwardly when depressed from a normal winding position to a braking position.

A conventional manual crank supported by a bearing member attached to housing 1 including a drive gear in fixed engagement with pinion 13 for rotating the latter in a well known manner are not shown.

Figure 4:
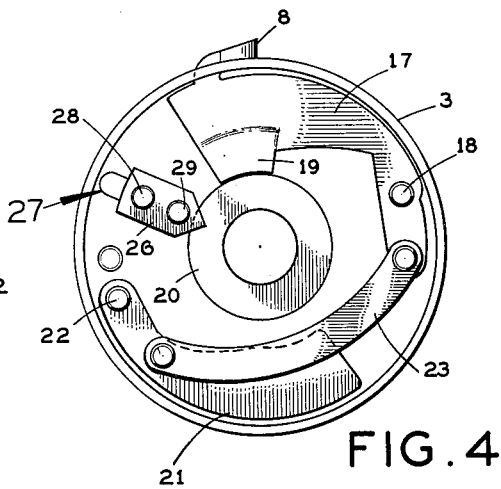
FIG. 4 is a rear elevation of the drum shown in FIG. 1 with certain elements being removed.

Referring to FIG. 4, a dog lever 17 is pivoted on a stud 18 secured on the outer wall of the drum 3. The heavier end of the lever terminates in a U shaped line dog 8 positioned to be projected through aperture 9 as shown in FIG. 1. A rest abutment 19 integral with the heavier end of the lever 17 is offset and has an arcuate inner surface adapted to rest on the edge of a disc 20 and will be hereinafter more specifically described. A counter balance lever 21 is pivoted at one end on a stud 22 also secured to the outer wall of drum 3. A link 23 is mounted at the outer ends thereof to levers 17 and 21 for combining and balancing the centrifugal action of both levers as shown.

Since the levers 17 and 21 are radially balanced with respect to the axis of rotation of the drum 3, there is no gravitational force tending to project or retract the dog 8 to and from the drum 3 when the drum is stationary.

Figure 8:
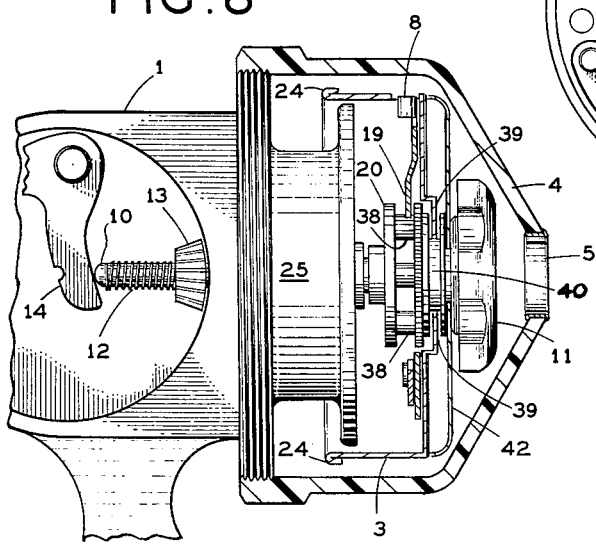
FIG. 8 is similar to FIG. 1 with certain portions shown in cross section in FIG. 7 being thereof shown in elevation and in changed position.

Referring to FIG. 1, the drum 3 has an integral flange 24 about its outer periphery which serves as a low friction line guide when winding and casting the line 6 to and from a fixed spool 25 coaxial with the drum, better shown in FIG. 8.

Figure 5:
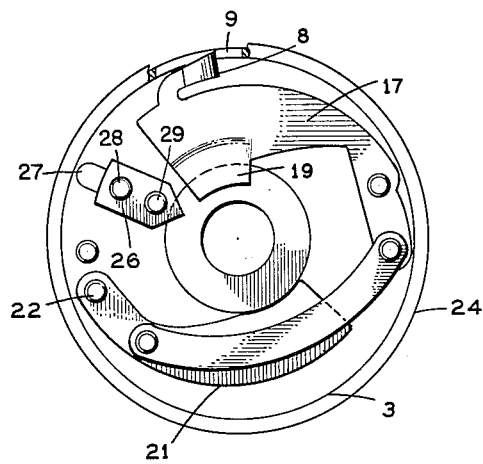
FIG. 5 is the same as FIG. 4 with the elements in changed position.

FIG. 5 illustrates the normal position of levers 17 and 21 when the winding dog 8 is retracted into drum 3.

Figure 3:
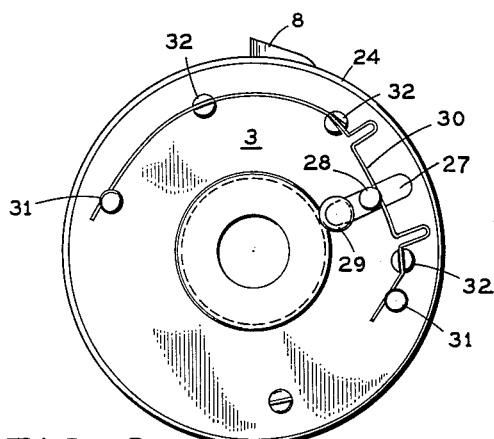
FIG. 3 is a front elevation of the drum shown in FIG. 1 with certain elements being removed.

Referring to FIGS. 3 and 4, a click member 26 is positioned for radial movement in a slot 27 in the outer wall of drum 3 and is retained therein by a pair of studs 28 and 29.

Figure 6:
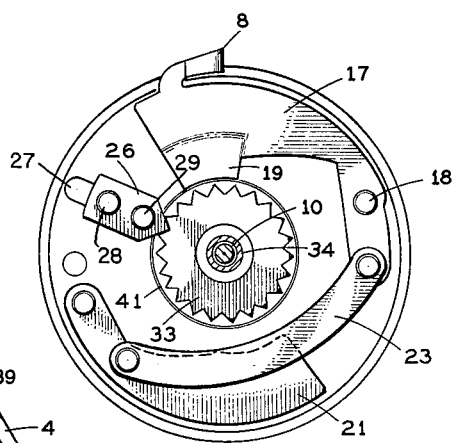
FIG. 6 is similar to FIG. 4 with a portion thereof being broken away.

A tension spring 30 is retained on the outer wall of drum 3 by grooved studs 31—31 and slotted studs 32—32—32. The resilient portion of the spring 30 bears against stud 28 and is retained by a groove therein as illustrated in FIG. 3 for urging the click inward into engagement with the teeth on click wheel 33 as shown in FIG. 6.

Figure 7:
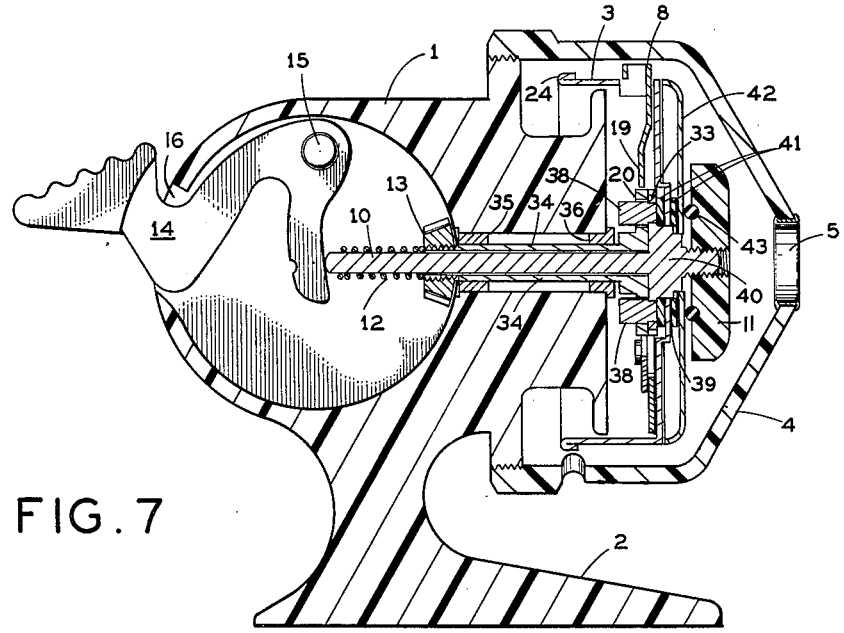
FIG. 7 is a side cross sectional elevation of the reel shown in FIG. 1.

Referring to FIG. 7, a hollow shaft 34 is journalled for rotation on bearings 35—36 secured in housing 1 coaxial with the drum 3 and a coaxial bore in shaft 34 provides a bearing for shaft 10 as shown. The inner end of shaft 34 is threaded into a gear 13 positioned to be driven by a crank gear, not shown. The outer end of shaft 34 terminates in disc 20. A click wheel 33 integral with shaft 10 is positioned adjacent flange 20 and has fixed therewith a pair of parallel pins 38—38 equi-distant from the axis of the shaft and which are loosely engaged in mating holes in flange 20. Thus the rotation of gear 13 will simultaneously rotate shaft 10 but will permit reciprocation of the latter relative to shaft 34.

The outer wall of the drum 3 has a central offset 39 retained on a hub 40 between a pair of friction washers 41, the inner one of which is positioned against wheel 33. A brake-wear disc 42 is loosely keyed on a square portion of hub 40 extending outward therefrom adjacent the outer washer 41.

Adjustment nut 11 is threaded on the end of hub 40 with a resilient ring 43, preferably of rubber, retained in a groove therein and positioned against the outer face of disc 42 for retaining the disc and adjusting the friction between the hub and the drum.

It will thus be apparent that the drum 3 will rotate with respect to hub 40 under the drag provided by friction washers 41 dependent upon the adjustment of nut 11.

It is also apparent that when the thumb lever 14 is depressed, shaft 10 and the drum assembly will move outward into close proximity to the inner conical periphery of drum housing 4 against the restraining action of spring 12 as illustrated in FIG. 8, with pins 38 still in driving engagement with flange 20.

The spool 25 as shown in FIG. 7 is integral with housing 1 and positioned coaxial with shaft 10.

In operation and referring to FIG. 1, it will be assumed that the line on the spool is threaded over the outside periphery of the drum 3 and through guide 5 and restrained from unwinding by the projected dog 8.

At the beginning of a cast, the thumb lever is depressed to brake position permitting the drum to assume the position shown in FIG. 8 with the dog retracted and holding the line wound on the spool. Then at an appropriate time during the cast, the thumb lever is released permitting the line to be cast from the reel by virtue of the rearward movement of the drum.

The range of the cast is controlled by again depressing the thumb lever to its brake position while the line is outrunning which will move the drum forward and grip the line between the disc 42 and the inner conical periphery of the housing 4, and thus retard and stop the free unwinding of the line from the spool. This braking action is also desirable to employ when playing a catch.

To retrieve the line, the thumb lever is released which will permit the drum to return to an intermediate position by the action of spring 12 with abutment 19 bearing against the outer face of disc 20. Then by rotation of the crank and drive gear means, not shown, driven gear 13 and drum 3 will rotate and impart centrifugal forces to levers 17 and 21 and move same to their outward positions shown in FIG. 4 with the dog 8 projected from the drum. At this instant of rotation, the abutment 19 will move radially beyond the edge of the disc 20 and then to a holding position adjacent the outer edge thereof which will simultaneously permit the entire drum to move into normal position by the action of spring 12 as shown in FIGS. 4 and 7. Further rotation of the drum will laterally engage the now projected dog 8 with the line and substantially level-wind same on spool 25. The abutment will remain in holding engagement with disc 20 in outward projected position after reeling in until released by a subsequent depression of the thumb lever.

It is to be noted that during the winding operation or counter rotation of the drum under drag conditions, the line will bear only against flange 24, wear disc 42, guide 5 and dog 8.

In the event of a strike or a snag during the reeling in operation when the main shaft 34 is under restraint of the crank means, the line will withdraw under drag conditions by the counter rotation of the drum with respect to shaft 10 by virtue of the action of the friction supplied by washers 41. It is also to be noted that when the drum is rotated under drag conditions the wear disc 42 will remain fixed with respect to shaft 10 thus distributing the line wear around the entire outer edge of the disc.

Due to the positioning of drum flange 24 directly over the spool and centered between the spool flanges, the line will be level wound on the spool to a satisfactory degree and the wound line will be substantially free of tangling.

During the counter rotation of drum 3 under drag conditions, the click member 26 will move over the teeth of click wheel 33 and give audible warning to the user.

It is understood that certain modifications of the aforesaid construction utilizing the features above described are intended to come within the scope of the appended claims.

Having described my invention I claim:

1. In a reel of the character described comprising a means forming a housing, spool means associated with said housing and adapted to retain a line wound thereon, a drum means having an end wall and a cylindrical side wall journalled for rotation in said housing coaxial with and adjacent said spool means and positioned to guide said line to and from said spool means, first lever means pivotably mounted off center on the end wall of said drum, said first lever means having at the periphery thereof a line engaging dog means, a second lever means counterbalancing said first lever means and pivotally mounted off center on the said end wall of the said drum, a connecting link pivotally connecting said first and second lever means, said drum means having an opening in the cylindrical side wall portion thereof, the rotation of said drum pivoting said first and second lever means on said end wall solely by centrifugal force and projecting the dog means through the opening in the said side wall into engagement with said line.

2. In a reel of the character described comprising a means forming a housing, spool means associated with said housing and adapted to retain a line wound thereon, a shaft journalled in said housing and adapted to be rotated and reciprocated therein, a tubular shaft mounted on said first shaft and having an intergal disc on the outer end thereof, a drum means having an end wall and a cylindrical side wall journalled for rotation on said shaft in said housing coaxial with and adjacent said spool means and positioned to guide said line to and from said spool means, first lever means pivotally mounted off center on the end wall of said drum, said first lever means comprising a line engaging dog means and an arcuate abutment portion adapted to rest on the periphery of said disc, a second lever means counterbalancing said first lever means and pivotally mounted off center on the said end wall of the said drum, a connecting link pivotally connecting said first and second lever means, said first and second lever means being radially balanced with respect to the axis of rotation of said drum means, said drum means having an opening in the cylindrical side wall portion thereof, the rotation of said drum causing said lever to pivot on said end wall solely by centrifugal force and to project said dog means through said opening into engagement with said line, the said dog means remaining in the projected position after rotation of said drum by means of the engagement of said arcuate abutment with said periphery of said disc.

3. In a reel of the character described comprising a means forming a housing, spool means associated with said housing and adapted to retain a line wound thereon, a drum means having an end wall and a cylindrical side wall journalled for rotation in said housing coaxial with and adjacent said spool means and positioned to guide said line to and from said spool means, a first lever means pivotably mounted off center on the end wall of said drum, said first lever means having at the periphery thereof a line engaging dog means, a second lever means pivotably mounted off center on said end wall opposite from said first lever means, link means connecting said first and second levers, said second lever counterbalancing said first lever means, said drum means having an opening in a cylindrical side wall portion thereof, rotation of said drum rotating and imparting centrifugal force causing said first lever to pivot on said end wall by centrifugal force and to project said dog means through said opening into engagement with said line, the said first and second said lever means being radially balanced with respect to the axis of rotation of said drum and said link combining and balancing the centrifugal force of both said levers.

References Cited in the file of this patent
UNITED STATES PATENTS

| | | |
|---|---|---|
| 2,667,312 | Denison et al. | Jan. 26, 1954 |
| 2,711,292 | Taggart et al. | June 21, 1955 |
| 2,713,463 | Sarah | July 19, 1955 |

FOREIGN PATENTS

| | | |
|---|---|---|
| 820,874 | Great Britain | Sept. 30, 1959 |